Feb. 10, 1959  A. H. ISENBERG  2,872,947
PROTECTIVE HOOD ENCLOSURES FOR ENDS
OF THERMALLY INSULATED PIPE UNITS
Filed April 2, 1956

INVENTOR.
ALEXANDER H. ISENBERG
BY
ATTORNEY

United States Patent Office 2,872,947
Patented Feb. 10, 1959

2,872,947

PROTECTIVE HOOD ENCLOSURES FOR ENDS OF THERMALLY INSULATED PIPE UNITS

Alexander H. Isenberg, Woodside, Calif.

Application April 2, 1956, Serial No. 575,608

4 Claims. (Cl. 138—64)

This invention relates to protective hood enclosures for ends of thermally insulated pipe units, and relates more particularly to protective hood enclosures at the ends of such units which are waterproof and protect the ends of conveyor pipe units in which there is a body or layer of thermal insulation which would otherwise be exposed to injury and damage and exposure to various weather conditions or from rough handling.

The thermally insulated pipe for which this invention is especially adapted is of the type having an inner conveyor pipe enclosed in thermal insulation which is in turn enclosed in a moisture impervious layer such as bitumen or asphalt, and surrounded by an outer casing. Such pipe may be formed in unit lengths at the place of fabrication and shipped to and installed as such units in the field or place of installing a system of such conduits, usually beneath ground surface, in which one unit is connected to a succeeding unit in a system by a joint formed therebetween in the field, and therefore commonly termed a field joint. In making such field joints the adjacent ends of the successive conveyor pipes are welded in situ, and then the field joint is packed for thermal and moisture insulation.

For facilitating the making of the weld of a field joint of successive pipes in a system, the conveyor pipe is preferably snugly rotatable in the enclosing layers and its terminal ends are the maximum length of the unit, and at its opposite ends beyond the ends of the immediately rounding body of thermal insulation, the latter extending beyond the ends of the moisture impervious asphaltic layer and the outer casing. Thus at each end of the conveyor pipe there is an exposed end portion of thermal insulation material extending beyond the moisture impervious layer, but of shorter length than the terminal end of the conveyor pipe. The material of the thermal insulation body is not hard and resistant to rough usage, nor is it highly resistant to absorption of moisture, being usually of well-known thermal insulating material such as asbestos, wool, magnesia, or the like. Wherefore, the desirability of protecting the exposed thermal insulation against injury in manufacture, shipment and installation, and especially against the absorption of moisture.

Briefly, the invention comprises a waterproof shield or hood for enclosing each of the exposed ends of the insulation body, the hood having one of its ends tightly gripped and sealed circumferentially of the body of insulation material and covering the exposed end thereof and extending forwardly towards the free terminal end of the conveyor pipe whereat it is sealed circumferentially of the latter. The hood may be of any flexible waterproof sheet material such as fabric, molded plastic, sheet metal, or the like, and, as exemplified herein, comprises circumferentially wrapped fabric impregnated with a waterproofing substance.

A preferred form in which the invention may be exemplified is described herein and illustrated in the accompanying drawings, which is made a part hereof.

Figure 1:
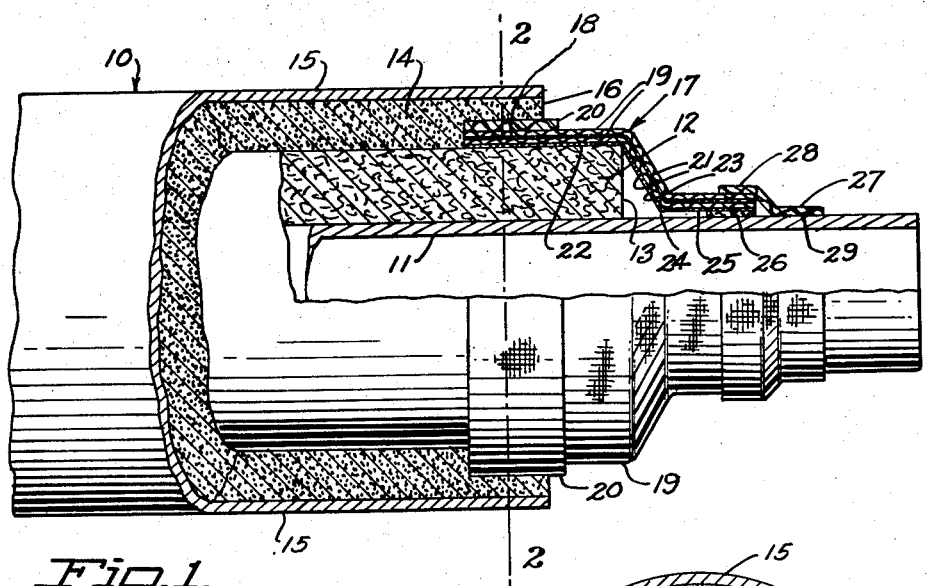
Fig. 1 is a fragmentary longitudinal end portion of a pipe unit partly in section, illustrating the structure of the invention, similar structure being at each end of the pipe unit.
Figure 2:
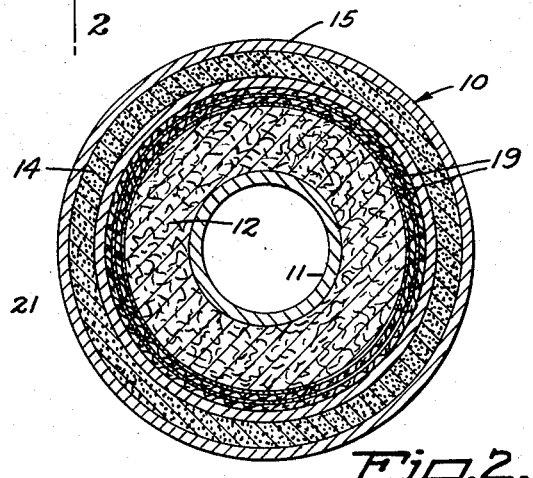
Fig. 2 is a lateral transverse section of line 2—2 of Fig. 1.

Referring to the drawing in which like reference characters indicate corresponding parts in the several views, 10 indicates generally a thermally insulated pipe unit, which may have the general characteristics of the pipe unit per se illustrated in Patent #2,545,030 dated March 13, 1951. The pipe unit has longitudinally centrally thereof a conveyor pipe 11, circumferentially of which and extending longitudinally thereof is a relatively closely fitting body of thermal insulation material 12, though preferably the conveyor pipe is axially rotatable therein. The terminal end of the thermal insulation is spaced from the terminal end of the conveyor pipe and is substantially perpendicular thereto as at 13. The body of thermal insulation may be of any suitable thermal insulation material, such as packed asbestos fibres, wool felt, magnesia or the like, preferably pre-formed prior to mounting it around the conveyor pipe.

Circumferentially enclosing the body of thermal insulation material 12, is a body of moisture impervious material 14, preferably an asphaltic or bitumen product which is pourable when heated and congeals upon cooling to normal temperature. An outer casing 15 encloses the bitumen layer and is the means for holding the flowable bitumen when heated and poured into the casing whereby it may flow to surround the enclosed thermal insulation material. The ends of the layer of bitumen 14 and the outer casing 15 are preferably coterminus and are adjacently spaced inwardly from the end of the thermal insulation providing an end wall as at 16.

Thus it will be noted that the component layers of materials are relatively stepped at the end portion of the pipe unit, and that there is a terminal end portion of the thermal insulation material which is exposed both to absorption of moisture and to injury from rough handling. It is therefore the purpose of this invention to provide an enclosure means for said exposed end portion of the thermal insulation material.

The enclosure means comprises a shield or hood generally indicated 17. As stated, the hood may be of any suitable flexible sheet material and is preferably a strip of flexible tearable waterproofed fabric material circumferentially wrapped around the exposed end portion of the thermal insulation and enclosing a sufficient portion of such end so that one side edge portion of the fabric wrapping is imperviously sealed at the end of the bitumen layer, for which reason and purpose it is preferred that said one edge of the hood shall extend between the thermal insulation and the end portion of the moisture impervious layer, as at 18. The strip of such fabric is of such desirable length that the wrapping thereof may be one or more thicknesses, two such relatively overlying wraps being illustrated as being generally efficient, as at 19. At said edge portion which is enclosed by the bitumen layer, the hood is wrapped with an adhesive tape 20 to securely position it. Manifestly, the hood 17 and the tape 20 are wrapped around the insulation material prior to forming of the moisture impervious layer thereround.

Figure 3:
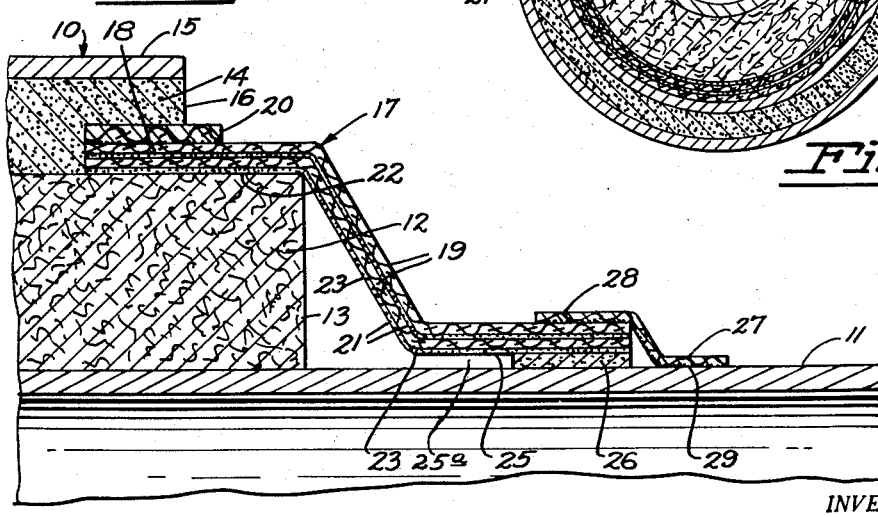
Fig. 3 is an enlarged fragmentary portion of Fig. 1 in section.

The inner face of the strip of the fabric hood preferably has an adhesive coating 21 preferably of the non-drying type commonly referred to as pressure sensitive adhesive. The fabric body of the hood 17 is of sufficient width not only to have its portion 18 enclosed by the moisture impervious layer, but also to extend along the exposed body of thermal insulation as at 22, then over the stepped terminal perpendicular end wall thereof, as at 23, and bent upon itself as at 24, and then to extend along the outer surface of the conveyor pipe as at 25, in relatively close removable contact therewith, though in the drawing of Figs. 1 and 3, there is a space shown at 25a in order to show some thickness to a caulking seal 26. Since the end portion of the hood within the moisture impervious layer is tightly sealed thereby against entry of moisture the precaution may be adopted at the outer edge of the hood of spreading a relatively thin circumferential layer of caulking material 26 between the fabric hood and the conveyor pipe. The outside terminal end edge portion of the hood is circumferentially wrapped by an adhesive terminal tape 27 of a width to partially enclose the end edge portion of the hood as at 28 and partially wrap around the conveyor pipe as at 29.

It will be noted that the thickness of the material of the hood 17, the tapes 20, 27, the adhesive layer 21, and the caulking material 26 have been exaggerated in the drawing in order to show a body thickness to those members, whereas said members in the actual construction are relatively thin, of the order of $\frac{1}{32}$ to $\frac{1}{16}$ inch.

In operation the hood is mounted on each of the ends of the pipe units at the place of fabrication of the units, the hood being applied in the manner set forth in the foregoing description. At the place of installation of the conduit system, and preferably immediately prior to the making of the field joint, the hood is removed by removal of the terminal tape 27, the flexible tearable hood 17 peeled or unwrapped, due to the pressure sensitive adhesive up to the end wall 16 of the then-hardened layer of bitumen 14 by which the remainder of the hood is held around the insulation body. The tearable flexible material of the hood is then sheared, preferably by tearing, against the end edge of the hardened bitumen, whereupon the field joints may be fabricated between the adjacent ends of two successive pipe units in a conduit system.

What is claimed as new and patentable is:

1. In a thermally insulated and moisture impervious conduit unit having an elongated tubular outer casing and having within said casing a conveyor pipe enclosed within a layer of thermal insulating material which is in turn enclosed within a layer of moisture impervious material, the terminal end portion of the thermal insulating material extending beyond the adjacent end of the moisture impervious layer and being thereby exposed, the combination therewith of a removable closure means at an end of the conduit unit comprising a hood of a plurality of overlying wrapped layers of flexible waterproofed tearable strip fabric having an adhesive material at one face thereof, said layers circumferentially enclosing the exposed end of the thermal insulation, one edge portion of the hood being circumferentially secured between the outer face of the thermal insulation layer and the inner face of the moisture impervious layer, and the opposite edge portion of the hood extending longitudinally along and being secured circumferentially of the conveyor pipe, the width of said strip enclosing both the circumeferential wall and the terminal end wall of that portion of the layer of insulation material which extends beyond the terminal end of the moisture impervious layer.

2. A thermally insulated and moisture impervious conduit unit of the character described, as set forth in the combination of claim 1, and in which the opposite circumferential edges of the flexible wrapped hood portion are sealed relative to the respective insulation material and conveyor pipe by circumferential removable adhesive tape wrappings.

3. In a thermally insulated conduit unit having an elongated tubular outer casing, and having within said casing a conveyor pipe enclosed within a layer of thermal insulating material which is in turn enclosed within a layer of moisture impervious material, the terminal ends of said conveyor pipe and respective layers being in stepped relation whereby the thermal insulation has an exposed end portion, the combination therewith of a closure means at an end of the conduit unit comprising a hood of a plurality of overlying circumferentially wrapped layers of flexible water-proofed tearable strip fabric circumferentially enclosing the exposed end portion of the thermal insulation, one edge portion of the hood being circumferentially secured between the outer face of the thermal insulation layer and the inner face of the moisture impervious layer, and the opposite edge portion of the hood being secured circumferentially of the conveyor pipe, an intermediate portion of said hood covering the exposed stepped end portion of the layer of thermal insulation.

4. In a thermally insulated conduit unit, as set forth in claim 3, the opposite edges of the hood being sealed by circumferential tape wrappings relative to the respective insulation body and the conveyor pipe.

References Cited in the file of this patent

UNITED STATES PATENTS

| | | |
|---|---|---|
| 70,388 | Ashcroft | Nov. 5, 1867 |
| 2,545,030 | Isenberg et al. | Mar. 13, 1951 |
| 2,695,254 | Isenberg et al. | Nov. 23, 1954 |